United States Patent [19]

Huang et al.

[11] Patent Number: 5,464,646

[45] Date of Patent: Nov. 7, 1995

[54] MANUFACTURING OF ACRIDITY-FREE RAW FLOUR FROM ARACEAE TUBERS

[75] Inventors: Alvin S. Huang; James Hollyer, both of Honolulu, Hi.

[73] Assignee: University of Hawaii, Honolulu, Hi.

[21] Appl. No.: 271,205

[22] Filed: Jul. 1, 1994

[51] Int. Cl.[6] .................................................. A23L 1/214
[52] U.S. Cl. ............................................ 426/615; 426/254
[58] Field of Search .................................. 426/615, 254

[56] References Cited

U.S. PATENT DOCUMENTS 3,767,424  10/1973  Shimizu et al. .......................... 426/372
4,246,289  1/1981  Tu ............................................ 426/254

*Primary Examiner*—Jeanette Hunter
*Assistant Examiner*—Choon P. Koh
*Attorney, Agent, or Firm*—Limbach & Limbach

[57] ABSTRACT

A method of removing acridity substances from Araceae tubers without cooking by first soaking the tubers in warm water to achieve maximum starch yield while leaving the starch ungelatinized followed by a dilute alkali treatment to achieve maximum removal of acridity substances.

8 Claims, No Drawings

MANUFACTURING OF ACRIDITY-FREE RAW FLOUR FROM ARACEAE TUBERS

FIELD OF INVENTION

This invention relates to a method of removing acridity substances from Araceae tubers without the need for cooking.

BACKGROUND OF THE INVENTION

Araceae tubers such as taro, genus Colocasia, and tubers of the genus Xanthosoma, Cyrtosperma and Alocasia are widely cultivated and consumed in over 60 countries worldwide. These tubers are good sources of fine-granule starches which are potential fat replacements and/or base materials in healthy food products including baby and convalescent food and hypo-allergenic food stuffs. However, these tubers also contain "acridity" substances which can cause irritation of the skin and swelling of the mouth and throat if the tubers are not processed correctly.

Certain prior methods of removing acridity substances from Araceae tubers involve cooking processes. Cooked Araceae tubers are very sticky and viscous and have a high moisture content. Consequently, the cooked tubers are difficult to handle, dry and store, thus limiting their usefulness as a food.

Tu, U.S. Pat. No. 4,246,289, describes a method of using high amounts of alkali followed by extensive washing to remove acridity substances from Araceae tubers without cooking. Although Tu avoids the aforementioned problems of cooking tubers to remove acridity substances, the Tu method utilizes high concentrations of alkali (2 to 5%) for long periods of time (10 to 24 hours). Such high base concentrations require careful manipulations and large amounts of water for rinsing in addition to lengthy rinse times. Such lengthy rinse times can lead to starch fermentation and sanitary problems resulting from microbial growth.

It would be advantageous to have a process for removing acridity substances from Araceae tubers that avoided the problems of the prior processes. It is therefore an object of the present invention to remove acridity from Araceae tubers without cooking and, at the same time, minimizing the base concentration and time necessary to remove the acridity substances from Araceae tubers.

SUMMARY OF THE INVENTION

In order to achieve this object, the present invention provides a process for producing low-acridity, low-starch gelatinization raw flour from Araceae tubers. In a first embodiment the Araceae particles are soaked in water at a temperature of from about 38° to about 48° C. for a period of less than 4 hours.

In a second embodiment, the method further comprises treating the tubers for sufficient time to remove acridity substances with an aqueous solution having an alkali concentration of from about 0.02 to about 0.1%.

In a third embodiment, the method further comprises drying the tubers and comminuting the tubers to form a flour.

In a further embodiment, the method comprises soaking the tubers at a temperature from 40° to 45° C. for less than 2 hours.

In yet another embodiment, the invention is a process for producing low-acridity, low-starch gelatinization raw flour from Araceae tubers comprising, in order, the steps: (a) soaking the tubers in water at a temperature of from about 38° to about 48° C. for a period of less than 4 hours; (b) treating the tubers for 0.5 hours with an aqueous solution having an alkali concentration of from about 0.02 to about 0.1%; (c) drying the tubers; and (d) comminuting the tubers to form a flour.

BRIEF DESCRIPTION OF THE DRAWING

The present invention will be better understood by reference to the appended drawing figure, of which:

FIG. 1 is a schematic diagram of the production of acridity-free flour from Araceae tubers.

DETAILED DESCRIPTION OF THE INVENTION

The present invention provides a method of removing acridity substances from Araceae tubers without cooking by first soaking the tubers in warm water to achieve maximum starch yield while leaving the starch ungelatinized followed by a dilute alkali treatment to achieve maximum acridity removal.

Thus, in a first embodiment, the Araceae tubers are washed with mechanical brushes and water spray. Next, the tubers are peeled with a rotary peeler. The tubers are then reduced in size with a mechanical grinder to form tuber particles. Next, the tuber particles are soaked in warm water. Next, the tuber particles are soaked in dilute alkali to remove acridity substances. Next, the alkali is neutralized with weak acid and the tubers are then rinsed with water. Next, the tuber particles are vacuum filtered to remove the water. Finally, the vacuum filtered tuber particles are dried in a dryer prior to being milled into flour with a milling machine.

FIG. 1 is a schematic diagram of the production of acridity-free flour from Araceae tubers. In FIG. 1, the Araceae tubers are rinsed in washer 1, transferred by conveyor 2 to steam box 3 for steaming. The steamed tubers are then transferred to brush peeler 4 for peeling. Elevator 5 transfers the peeled tubers to container 6. The tubers are then transferred by conveyor 7 to rasp 8 for grinding into tuber particles.

In the practice of the invention the tubers are cut into pieces of any geometrical shape such as cubes, squares, rectangles, etc. Typically, the pieces have the following dimensions: cubes, about 10 millimeters (mm); squares, about 20×20×2 mm; rectangles, 20×10×2 mm. However, as a general rule the size of the pieces can vary but should not be so small as to lose their integrity during the process of the invention nor so large as to render the instant method ineffective.

The tuber particles are collected in bin 9, mixed with water and pumped by pump 10 to tank 11. Tank 11 contains stirring and heating apparatuses for mixing and warming the tuber particles. The tuber particles are mixed at temperatures ranging from 38° to 48° C. for a period of 1.5–10, preferably 2, hours. The tuber particles are then passed through a sieve 12 of 60 to 200 mesh prior to collection in tank 13. Tank 13 also contains a stirring apparatus.

The cut tubers are next extracted in tank 13 with an aqueous alkaline agent, such as sodium hydroxide, potassium hydroxide, calcium hydroxide, magnesium hydroxide and the like, which is non-poisonous. Usually, the concentration of alkaline agent is about 0.02 to 0.06%, preferably 0.06%, based on the weight of tubers. The alkaline mixture is mixed at room temperature (about 20° C.) for a period of time sufficient to remove the acrid substances from the tubers. As short a period of time as possible is preferred and we have found that one-half hour is optimal.

Following this alkaline treatment, the tuber pieces are washed with dilute aqueous food grade acid such as hydrochloric acid, sulfuric acid, phosphoric acid, and the like. Acid should be added until the pH of the tuber mixture is neutral, i.e., about 5.5–8.5. The tuber pieces are then rinsed with water.

The rinsed tuber pieces are then separated from the water utilizing a rotary vacuum filter 14. The tubers are then transferred from the rotary vacuum filter to a dryer 16 and dried to a moisture content of about 5–10%. The dried pieces are then transferred to a mill 17 for milling into flour prior to packaging.

The new tuber flour of the invention may be stored and/or transported without refrigeration. To reconstitute (hydrate) the flour for consumption, it may be placed in about 5–10 parts of water per part of dry flour. The reconstituted flour paste easily cooked, if needed, requiring about one hour in boiling water and may be included in a number of recipes. The raw flour may be used directly without cooking in many other recipes. If desired, the hydration solution may contain vitamins, minerals, and other nutrients, which are absorbed into the pieces and retained therein. The process of the invention may be applied to partially cooked tuber pieces as well as uncooked. It is therefore the intent of this disclosure to include such a variation within the scope of the present method.

The invention is further demonstrated by the following illustrative examples.

EXAMPLE 1

A factorial analysis of the effect of pre-soak time, temperature and % alkali post-soak treatment on flour acridity and starch gelatinization was performed. Araceae tubers were washed with mechanical brushes and water spray and then peeled with a rotary peeler. The tubers were then reduced in size with a mechanical grinder to form tuber particles. The tuber particles were then soaked in warm water for 2 to 48 hours at temperatures from 20° to 50° C. The tubers were then soaked in 0 to 3.5% sodium hydroxide for 0.5 to 10 hours. The tubers were neutralized with dilute acid and rinsed with water. After centrifugation, the starch mass was dried in a dryer. Flour acidity and starch gelatinization were determined. The results are presented in Table 1.

TABLE 1

| ALKALI (%)[a] | TEMP. (°C.) | SOAKING TIME (HR) | ACRID-ITY (1–9)[b] | STARCH GELA-TINIZATION (Brabender Unit)[c] |
| --- | --- | --- | --- | --- |
| 0 | 20 | 48 | 9 | 810 |
| 0 | 30 | 48 | 9 | 780 |
| 0 | 40 | 25 | 7 | 785 |
| 0 | 45 | 22 | 5 | 735 |
| 0 | 50 | 15 | 4 | 230 |
| 0.02 | 20 | 48 | 8–9 | 770 |
| 0.02 | 30 | 48 | 8 | 750 |
| 0.02 | 40 | 24 | 7 | 730 |
| 0.02 | 45 | 22 | 5 | 650 |
| 0.02 | 50 | 12 | 4 | 145 |
| 0.04 | 20 | 48 | 7 | 760 |
| 0.04 | 30 | 48 | 6 | 725 |
| 0.04 | 40 | 24 | 5 | 680 |
| 0.04 | 45 | 20 | 3 | 565 |

TABLE 1-continued

| ALKALI (%)[a] | TEMP. (°C.) | SOAKING TIME (HR) | ACRID-ITY (1–9)[b] | STARCH GELA-TINIZATION (Brabender Unit)[c] |
| --- | --- | --- | --- | --- |
| 0.04 | 50 | 10 | 1 | 120 |
| 0.06 | 20 | 48 | 5 | 760 |
| 0.06 | 30 | 40 | 3 | 690 |
| 0.06 | 40 | 2 | 1 | 710 |
| 0.06 | 45 | 2 | 0–1 | 690 |
| 0.06 | 50 | 2 | 0–1 | 245 |
| 0.08 | 20 | 40 | 5 | 765 |
| 0.08 | 30 | 24 | 4 | 700 |
| 0.08 | 40 | 2 | 1 | 710 |
| 0.08 | 45 | 2 | 0–1 | 685 |
| 0.08 | 50 | 2 | 0–1 | 240 |
| 0.1 | 20 | 40 | 4 | 770 |
| 0.1 | 30 | 25 | 4 | 680 |
| 0.1 | 40 | 2 | 1 | 710 |
| 0.1 | 45 | 2 | 0–1 | 660 |
| 0.1 | 50 | 2 | 0–1 | 190 |
| 0.2 | 20 | 24 | 3 | 780 |
| 0.2 | 30 | 20 | 3 | 650 |
| 0.2 | 40 | 2 | 1 | 660 |
| 0.2 | 45 | 2 | 0–1 | 565 |
| 0.2 | 50 | 2 | 0–1 | 145 |
| 0.5 | 20 | 4 | 3 | 700 |
| 0.5 | 30 | 4 | 2–3 | 680 |
| 0.5 | 40 | 2 | 1 | 675 |
| 0.5 | 45 | 2 | 0–1 | 545 |
| 0.5 | 50 | 2 | 0–1 | 95 |
| 1.0 | 20 | 4 | 2–3 | 670 |
| 1.0 | 30 | 2 | 2 | 665 |
| 1.0 | 40 | 2 | 1 | 640 |
| 1.0 | 45 | 2 | 0–1 | 545 |
| 1.0 | 50 | 2 | 0–1 | 100 |
| Tu's Condition: | | | | |
| 3.5 | 25 | 10 | 2 | 15 |

[a]Time of alkali soaking was 0.5 hour except in Tu's condition (10 hours) (U.S. Pat. No. 4,246,289).
[b]Acridity was rated by sensory with "9" being the strongest in acridity and "0–1" being the weakest.
[c]Starch gelatinization was measured by the Brabender unit in which a decrease in reading indicates a decrease in starch structure and an increase in starch gelatinization (cooking).

EXAMPLE 2

Based on the results from Example 1, a series of experiments were conducted to further delineate the preparation conditions which produce flour exhibiting acceptable acridity and starch gelatinization levels. In the first series of experiments a two hour soak at temperatures between 30°–40° C. (the low end of the temperature range) and 45°–50° C. (the high end of temperature range) is followed by an 0.06% base treatment. The acidity and gelatinization levels for the resulting flour were determined and the temperature endpoints which produce an acceptable product were noted. Results are presented in Table 2.

TABLE 2

| Temperature (°C.) | Time (hr) | Acridity | BU | Acceptability |
| --- | --- | --- | --- | --- |
| 30 | 2 | 6 | 780 | no (high acridity) |
| 35 | 2 | 4–5 | 770 | no (high acridity) |
| 38 | 2 | 3 | 705 | maybe |
| 40 | 2 | 2 | 680 | yes |
| 45 | 2 | 1 | 665 | yes |
| 48 | 2 | 1 | 435 | no (low BU) |

*Acceptability: Acridity < 3 and BU > 500; applied to the rest of the experiments.

EXAMPLE 3

Based on the results from Example 2, data points were taken at the upper and lower temperature points and at a temperature midway between the endpoints. In this set of experiments the base concentration was held constant at 0.06%. The length of the soak was varied to determine the upper and lower limits of soak times which produce an acceptable result. The results are presented in Table 3.

TABLE 3

| Temperature (°C.) | Time (hr) | Acridity | BU | Acceptability |
| --- | --- | --- | --- | --- |
| 38 | 2 | 3 | 710 | questionable |
|  | 3 | 3 | 700 | questionable |
|  | 4 | 2–3 | 685 | yes |
| 40 | 0.5 | 5 | 880 | no |
|  | 1 | 4–5 | 820 | no |
|  | 1.5 | 2–3 | 790 | yes |
|  | 2 | 1–2 | 775 | yes |
|  | 3 | 1 | 740 | yes |
|  | 24 | 1 | 685 | no (microbial) |
| 43 | 0.5 | 5 | 815 | no |
|  | 1 | 3 | 730 | questionable |
|  | 1.5 | 2 | 680 | yes |
|  | 2 | 1 | 670 | yes |
|  | 3 | 1 | 650 | yes |
|  | 24 | 0–1 | 620 | no (microbial) |
| 48 | 0.5 | 5 | 785 | no |
|  | 1 | 3 | 610 | questionable |
|  | 1.5 | 1 | 530 | yes |
|  | 2 | 1 | 420 | no |

*At these temperatures, soaking for 24 hours may cause starch fermentation and sanitary concerns (i.e. microbial growth). A long-period soaking may add production costs as well.

EXAMPLE 4

Finally, in a third set of experiments, data points were taken at each temperature endpoint and the temperature midpoint. For each of these temperatures, the soak was conducted for time points corresponding to the endpoints and midpoint determined in Example 3. For each of these samples, the base treatment was conducted over a range of base concentrations such that endpoints were determined beyond which an unacceptable product is obtained. The results are presented in Table 4.

TABLE 4

| Temp (°C.) | Time (hr) | Alkali (%) | Acridity | BU | Acceptability |
| --- | --- | --- | --- | --- | --- |
| 38 | 4 | 0.02 | 8 | 810 | no |
|  |  | 0.04 | 5 | 780 | no |
|  |  | 0.06 | 2 | 770 | yes |
|  |  | 0.1 | 1 | 740 | yes |
| 40 | 3 | 0.02 | 8 | 780 | no |
|  |  | 0.04 | 5 | 770 | no |
|  |  | 0.06 | 1 | 710 | yes |
|  |  | 0.1 | 1 | 700 | yes |
| 43 | 1.5 | 0.02 | 7 | 780 | no |
|  |  | 0.04 | 5 | 720 | no |
|  |  | 0.06 | 2 | 680 | yes |
|  |  | 0.1 | 1 | 650 | yes |
| 48 | 1.5 | 0.02 | 6 | 670 | no |
|  |  | 0.04 | 4 | 590 | no |
|  |  | 0.06 | 1–2 | 540 | yes |
|  |  | 0.1 | 1 | 480 | no |

The results indicate that flour quality is enhanced when the warm water soak is conducted for a period of 1–2 hours at 38°–48° C. An extended soaking time did not increase the flour quality in terms of Brabender Units or acridity. The longer soaking in water will add to the processing costs and may cause sanitary concerns as a result of increased microbial growth. The optimum alkali content is 0.06% although some effect is seen at 0.02 and 0.04%.

Although only the most preferred embodiment of the invention has been shown and described, modifications of the method of removing acridity substances from Araceae tubers without the need for cooking will be apparent to those skilled in the art, and modifications which include such features are therefore considered to be within the scope of the appended claims.

What is claimed is:

1. A process for producing low-acridity, low-starch gelatinization raw flour from Araceae tubers comprising the steps of:
    (a) providing tuber particles from Araceae tubers;
    (b) soaking said tuber particles in water at a temperature of from about 38° to about 48° C. for a period of less than 4 hours;
    (c) treating said tuber particles for a time sufficient to remove acridity substances with an aqueous solution having an alkali concentration of from about 0.02 to about 0.1%;
    (d) drying said tuber particles; and
    (e) comminuting said tuber particles to form a flour.

2. The process of claim 1 wherein the temperature is from 40° to 45° C., the soak period is for less than 2 hours and the alkali content is 0.06%.

3. The process of claim 1 wherein the alkali is selected from the group consisting of sodium hydroxide, potassium hydroxide, calcium hydroxide, sodium carbonate and magnesium hydroxide.

4. The process of claim 3 wherein the alkali is sodium hydroxide.

5. A process for producing low-acridity, low-starch gelatinization flour from Araceae tubers comprising the steps:
    (a) soaking Araceae tubers in water at a temperature of from about 38° to about 48° C. for a period of less than 4 hours;
    (b) treating said tubers for 0.5 hours with an aqueous solution having an alkali concentration of from about 0.02 to about 0.1%;
    (c) drying said tubers; and
    (d) comminuting said tubers to form a flour.

6. The process of claim 5 wherein the temperature is from 40° to 45° C., the soak period is for less than 2 hours and the alkali content is 0.06%.

7. The process of claim 6 wherein the alkali is selected from the group consisting of sodium hydroxide, potassium hydroxide, calcium hydroxide, sodium carbonate and magnesium hydroxide.

8. The process of claim 6 wherein the alkali is sodium hydroxide.

* * * * *